US008831662B2

(12) United States Patent
Qi et al.

(10) Patent No.: US 8,831,662 B2
(45) Date of Patent: Sep. 9, 2014

(54) RESERVED VIRTUAL RADIO CONFERENCE CALLING

(75) Inventors: Ying Qi, Sichuan (CN); Shu-Shan He, Sichuan (CN); Zhou Yang, Sichuan (CN); Rui Zhong, Sichuan (CN)

(73) Assignee: Motorola Solutions, Inc., Schaumburg, IL (US)

( * ) Notice: Subject to any disclaimer, the term of this patent is extended or adjusted under 35 U.S.C. 154(b) by 61 days.

(21) Appl. No.: 13/556,321

(22) Filed: Jul. 24, 2012

(65) Prior Publication Data
US 2014/0031019 A1    Jan. 30, 2014

(51) Int. Cl.
*H04B 7/00*         (2006.01)

(52) U.S. Cl.
USPC ........... 455/518; 455/416; 455/519; 455/464; 370/260; 370/261; 370/263; 379/93.21; 379/158; 379/202.01

(58) Field of Classification Search
CPC ...................................... H04W 4/00
USPC ........... 455/414.2, 415–416, 418–420, 422.1, 455/518–519, 459, 509, 450, 455, 464, 455/41.2; 370/260–263, 266, 270; 379/93.21, 158, 202.01, 205.01
See application file for complete search history.

(56) References Cited

U.S. PATENT DOCUMENTS

| 7,650,142 | B2 | 1/2010 | Longman et al. | |
|---|---|---|---|---|
| 2003/0053612 | A1* | 3/2003 | Henrikson et al. | 379/202.01 |
| 2006/0171337 | A1* | 8/2006 | Shaffer et al. | 370/261 |
| 2007/0239885 | A1* | 10/2007 | Vadlakonda et al. | 709/232 |
| 2008/0205616 | A1 | 8/2008 | Teng et al. | |
| 2008/0207241 | A1* | 8/2008 | Namm et al. | 455/518 |
| 2011/0002452 | A1 | 1/2011 | Van Der Laak et al. | |

FOREIGN PATENT DOCUMENTS

| EP | 0692170 | B1 | 12/1999 |
|---|---|---|---|
| EP | 0839433 | B1 | 11/2004 |
| WO | 0131968 | A1 | 5/2001 |
| WO | 2004049677 | A2 | 6/2004 |
| WO | 2009155079 | A2 | 12/2009 |

* cited by examiner

*Primary Examiner* — Babar Sarwar
(74) *Attorney, Agent, or Firm* — Daniel R. Bestor

(57) ABSTRACT

Disclosed is a two-way radio frequency (RF) communications system including a first device that receives, from a first subscriber unit, a virtual radio conferencing call (VRC) request identifying a plurality of other subscriber units to be partied to the VRC call and a conference time period during which to conduct the VRC call. The device reserves RF resources at one or more corresponding radio sites associated with the subscriber units partied to the VRC call for the conference time period. At a beginning of the conference time period, the device causes a virtual radio conference call start message to be transmitted to the subscriber units partied to the call instructing the subscriber units to join the VRC call via the reserved RF resources at their respective radio sites.

21 Claims, 6 Drawing Sheets

RESERVED VIRTUAL RADIO CONFERENCE CALLING

FIELD OF THE DISCLOSURE

The present disclosure relates generally to providing site and system-wide reserved virtual radio conference calls for groups of radios in a radio access network.

BACKGROUND OF THE DISCLOSURE

Wireless communication systems provide for radio communication links to be arranged within the system between a plurality of user terminals. Such user terminals may be mobile and may be known as 'mobile stations' or 'subscriber units.' At least one other terminal, e.g. used in conjunction with subscriber units, may be a fixed terminal, e.g. a control terminal, base station, repeater, and/or access point. Such a system typically includes a system infrastructure which generally includes a network of various fixed terminals, which are in direct radio communication with the subscriber units. Each of the base stations operating in the system may have one or more transceivers which may, for example, serve subscriber units in a given local region or area, known as a 'cell' or 'site', by radio frequency (RF) communication. The subscriber units that are in direct communication with a particular fixed terminal are said to be served by the fixed terminal. In one example, all radio communications to and from each subscriber unit within the system are made via respective serving fixed terminals. Sites of neighboring fixed terminals in a wireless communication system may be offset from one another or may be non-overlapping or partially or fully overlapping.

Wireless communication systems may operate according to an industry standard protocol such as, for example, the Project 25 (P25) standard defined by the Association of Public Safety Communications Officials International (APCO), or other radio protocols, such as the TETRA standard defined by the European Telecommunication Standards Institute (ETSI), the Digital Private Mobile Radio (dPMR) standard also defined by the ETSI, or the Digital Mobile Radio (DMR) standard also defined by the ETSI. Communications in accordance with any one or more of these standards, or other standards, may take place over physical channels in accordance with one or more of a TDMA (time division multiple access), FDMA (frequency divisional multiple access), or CDMA (code division multiple access) protocol. Subscriber units in wireless communication systems such as those set forth above send speech and data, herein referred to collectively as 'traffic information', in accordance with the designated protocol.

Many so-called "public safety" wireless communication systems provide for group-based radio communications amongst a plurality of subscriber units such that one member of a designated group can transmit once and have that transmission received by all other members of the group substantially simultaneously. Groups are conventionally assigned based on function. For example, all members of a particular local police force may be assigned to a same group so that all members of the particular local police force can stay in contact with one another, while avoiding the random transmissions of radio users outside of the local police force.

Typically, such groups are assigned a fixed priority, and with the exception of emergency calls and all-calls (e.g., a call to all active members in a wireless communication network), each group is assigned a same priority as other groups and if one or more other groups are already using all available RF resources at a site at which a group member resides, a particular group may be unable to initiate a new group call to all of its members when needed or desired. Furthermore, once a particular talk group is already granted an RF resource (e.g., a pair of an uplink channel and a downlink channel, separated by frequency, time, or code), the RF resource is generally reserved for a short time period after it was last used by a member of the talk group to allow for another talk group member to respond to the prior speaker (hereinafter referred to as a "call hang-time"). Call hang-time is generally configured at the system level and may be set, for example, to three (3) seconds. After the call hang-time has expired, any other group can start a new group call and effectively consume the RF resource that was being used by the previous talk group (e.g., those RF resources are now no longer available to the previous talk group). Accordingly, any member of the previous talk group wishing to further communicate with the previous talk group after the call hang-time would need to go through an entirely new call set-up process, and be subject to a possible lack of sufficient RF resources to start the new group call.

Accordingly, a system and method is needed for two-way radio systems to allow for reserved virtual radio conference calls such that RF resources are reserved at one or more radio sites for all group members participating in the virtual radio conference call, and such that the RF resources reserved for the group are not made available to other groups or subscriber units during the predetermined duration of the virtual radio conference call.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
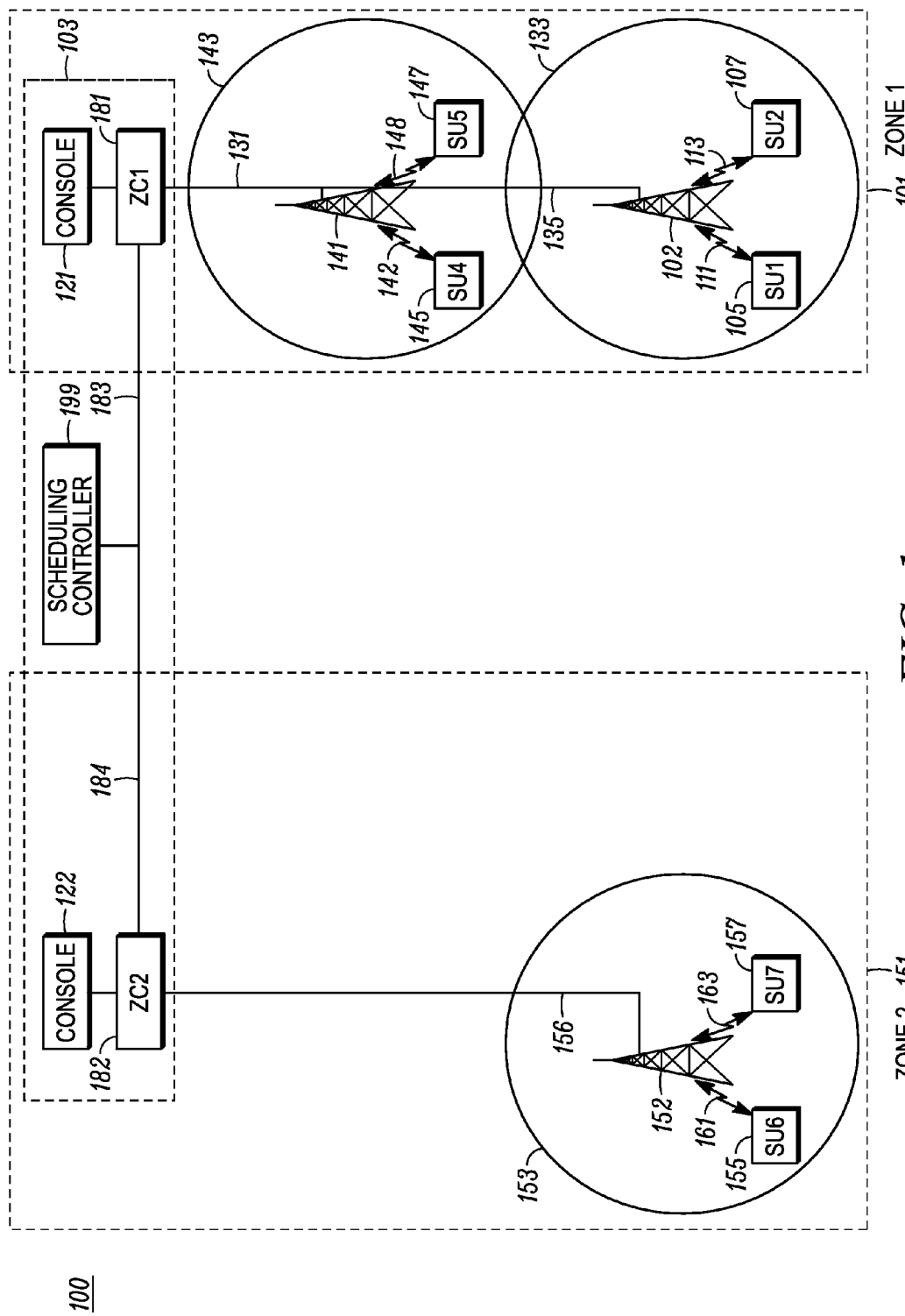
FIG. 1 is a schematic diagram of a wireless communication system in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DISCLOSURE

In light of the foregoing, it would be advantageous to provide for a system and method that provides for two-way radio systems to reserve virtual radio conference calls such that RF resources are reserved at one or more radio sites for all group members participating in the virtual radio conference call, and such that the RF resources reserved for the group are not made available to other groups or subscriber units throughout the predetermined duration of the virtual radio conference call.

In one embodiment, a two-way radio frequency (RF) communications system includes a first device that receives, from a first subscriber unit, a virtual radio conferencing call (VRC) request identifying a plurality of other subscriber units to be partied to the VRC call and a conference time period during which to conduct the VRC call. The device reserves RF resources at one or more corresponding radio sites associated with the subscriber units partied to the VRC call for the conference time period. At a beginning of the conference time period, the device causes a virtual radio conference call start message to be transmitted to the subscriber units partied to the call instructing the subscriber units to join the VRC call via the reserved RF resources at their respective radio sites.

In another embodiment, a two-way communications system having at least one fixed terminal, one or more RF resources, and a plurality of subscriber units, includes a first subscriber unit configured to transmit a new virtual radio conference call request message identifying a plurality of participating subscriber units and a conference time period. The first subscriber unit, at substantially a beginning of the conference time period, receives a virtual radio conference call start message and responsively joins the conference on a reserved RF resource indicated in the virtual radio conference call start message. During the virtual radio conference call, the first subscriber unit ignores an uplink busy indication received on a downlink channel of the reserved RF resource to keep other subscriber units not participating in the conference from keying up, and responsive to detecting a user actuation of a push to talk (PTT) button, requests transmit authorization and subsequently transmits traffic on the uplink to the other subscriber units participating in the virtual radio conference call. Responsive to detecting an end call trigger, the first subscriber device ends participation in the virtual radio conference call.

Each of the above-mentioned embodiments will be discussed in more detail below, starting with example network and device architectures of the system in which the embodiments may be practiced, followed by a discussion of virtual radio conference call reservation, conduct, and termination from the point of view of the infrastructure device (e.g., the scheduling controller) and the subscriber unit. Further advantages and features consistent with this disclosure will be set forth in the following detailed description, with reference to the figures.

I. NETWORK AND DEVICE ARCHITECTURES

FIG. 1 shows a wireless communication system 100 which may be adapted in accordance with an embodiment of the disclosure. It will be apparent to those skilled in the art that the system 100 and the components which are to be described as operating therein may take a number of forms well known to those skilled in the art. Thus, the layout of the system 100, and of its operational components to be described, should be regarded as illustrative rather than limiting. The system 100 of FIG. 1 will be described as an illustrative wireless communication system capable of operating in accordance with any one or more standard protocols, such as the APCO P25 standard, the DMR standard, or the TETRA standard, among other possibilities.

The system 100 shown in FIG. 1 may be implemented across a plurality of zones including a first zone 101 and a second zone 151, interconnected via a system infrastructure 103. While FIG. 1 uses a plurality of zones, one zone for each of two physically distinct geographic areas, as example service areas, the system 100 could be applied to other types of service areas as well, including single-site service areas (without a zone controller), single-zone service areas, and multiple-zone service areas. The first zone 101 (a zone including one or more related radio sites) includes one or more fixed terminals (e.g., base stations/repeaters/control terminals, hereinafter base stations (BSs)) 102, 141 which may be operably connected to the system infrastructure 103 via respective wired or wireless links 131, 135. While the term BS will be used to refer to the fixed terminals for ease of reference, it should be noted that the fixed terminals may, in some embodiments, be a repeater or a control terminal, or some other type of fixed terminal. The BS 102 has radio links with a plurality of subscriber units, particularly subscriber units (SUs) in a service cell or radio site 133 at least partially defined by a geographic location of the BS 102. In addition to SUs, BS 102 may maintain a link with a dispatch console 121 or other operator in the system infrastructure 103. The dispatch console 121 may be configured to act as a communications client of BS 102. Two SUs SU1 105 and SU2 107 are illustrated in FIG. 1 as being within the service area of, and being registered with, BS 102 via respective radio links 111, 113, the radio links 111, 113 comprising shared or separate uplink (from the SU to the BS) and downlink (from the BS to the SU) channels separated by at least one of frequency, time, and code. In one embodiment, the BS 102 serves SUs including the SUs SU1 105, SU2 107 with radio communications to and from other terminals, the other terminals including (i) other SUs served by the BS 102, (ii) SUs served by other BSs such as BS 141, (iii) other SUs in other zones (e.g., SU's at the second zone 151) operably linked to the BS 102 via the system infrastructure 103, and/or (iv) the console 121.

BS 141 similarly has radio links with one or more SUs, particularly SUs in a service cell or radio site 143 at least partially defined by a geographic location of the BS 141. In addition to SUs, BS 141 may also maintain a link with the dispatch console 121 or other operator. Two SUs SU4 145 and SUS 147 are illustrated in FIG. 1 as being within the service area of, and being registered with, BS 141 via respective radio links 142, 148, the radio links 142, 148 comprising shared or separate uplink and downlink channels separated by at least one of frequency, time, and code. The BS 141 thereby serves SUs SU4 145 and SU5 147 with radio communications to and from other terminals, the other terminals including (i) other SUs served by the BS 141, (ii) SUs served by other BSs such as BS 102, (iii) other SUs in other zones (e.g., SU's at the second zone 151) operably linked to the system 100 via the system infrastructure 103, and/or (iv) the console 121.

The second zone 151 includes a fixed terminal BS 152 which may be operably connected to the system infrastructure 103 via a respective wired or wireless link 156. The BS 152 has radio links with a plurality of SUs in a service cell or radio site 153 at least partially defined by a geographic location of the BS 152. In addition to SUs, BS 152 may maintain a link with a dispatch console 122 or other operator. The dispatch console 122 may be configured to act as a communications client of BS 152. Two SUs SU6 155, SU7 157 are illustrated in FIG. 1 as being within the service area of, and being registered with, BS 152 via respective radio links 161, 163, the radio links 161, 163 comprising shared or separate uplink and downlink channels separated by at least one of frequency, time, and code. In one embodiment, the BS 152 serves SUs including the SUs SU6 155, SU7 157 with radio communications to and from other terminals, the other terminals including (i) other SUs served by the BS 152, (ii) SUs served by other BSs (not shown), (iii) other SUs in other zones (e.g., SU's at the first zone 101) operably linked to the BS 152 via the system infrastructure 103, and/or (iv) the console 122.

Each of the BSs 102, 141, 152 may operate as a conventional radio site or a trunked radio site. In a conventional radio system, a plurality of SUs are formed into groups. Each group uses an assigned RF resource (statically assigned) for communication. Thus, each group is associated with a corresponding RF resource, and each RF resource can only be used by one group at any particular moment in time. In systems in which multiple groups may operate on a same shared RF resource, a unique group ID embedded in the group communications may be used to differentiate them.

In a trunked radio system, SUs use a pool of RF resources. Thus, all groups are served by all RF resources. For example, in a trunking system, all SUs operating at a radio site idle on an initial designated control channel or rest channel and when a new call is requested over the control or rest channel, is assigned an RF resource from the pool (e.g., a pair of an uplink traffic channel and a downlink traffic channel, hereinafter a traffic channel (TC)) for the new group call, to which the participating SUs switch to, while remaining SUs not participating in the new group call stay on the initial designated control channel or rest channel (or vice versa). Other conventional and trunked configurations are possible as well.

The system infrastructure 103 includes known sub-systems required for operation of the wireless communication system 100. Such sub-systems may include, for example, sub-systems providing authentication, routing, SU registration and location, system management, and other operational functions within the system 100. In some embodiments, a zone controller (ZC) provided for each zone such as first and second ZCs ZC1 181, ZC2 182 may provide for some or all of the authentication, routing, SU registration and location, system management, and other operational functions for their corresponding zone (in this case, the first zone 101 including radio sites 133 and 143 and the second zone 151 including radio site 153, respectively). In some embodiments, a zone may be associated with a particular land geography (e.g., a first city or town and a second city or town), a user type (e.g., police, fire, etc.), a particular owner operator (e.g., government agency, company, etc.), other physical areas (schools, government buildings, armed forces bases, etc.), or some other attribute or characteristic.

The system infrastructure 103 may additionally provide routes to other BSs or zones (not shown) providing radio sites serving other SUs, and/or may provide access to other types of networks such as a plain old telephone system (POTS) network or a data-switched network such as the Internet. The system infrastructure 103 may also maintain a scheduling controller (SC) 199, coupled to the first and second zone controllers ZC1 181, ZC2 182 via wired or wireless links 183, 184 for receiving and processing VRC call reservation requests, managing VRC reservations across the multiple sites and/or zones, prioritizing VRC reservation requests, ensuring that RF resource reservations are enforced at each of the radio sites, ending VRC calls, and/or other operations. While the SC 199 is depicted within system infrastructure 103 and separate from the ZCs 181, 182 in FIG. 1, in other embodiments, the SC 199 may be implemented within either or both of ZCs 181, 182, in any one or more of BSs 102, 141, or 152, or at some other point in the network in either a centralized or distributed manner. If implemented in a distributed manner, for example at BSs 102, 141, and 152, messaging protocols may be implemented between distributed instantiations of the SC to ensure that RF resources are not being double booked or that RF resources are and will be available at each BS involved in a particular VRC call. Other possibilities exist as well.

Figure 2:
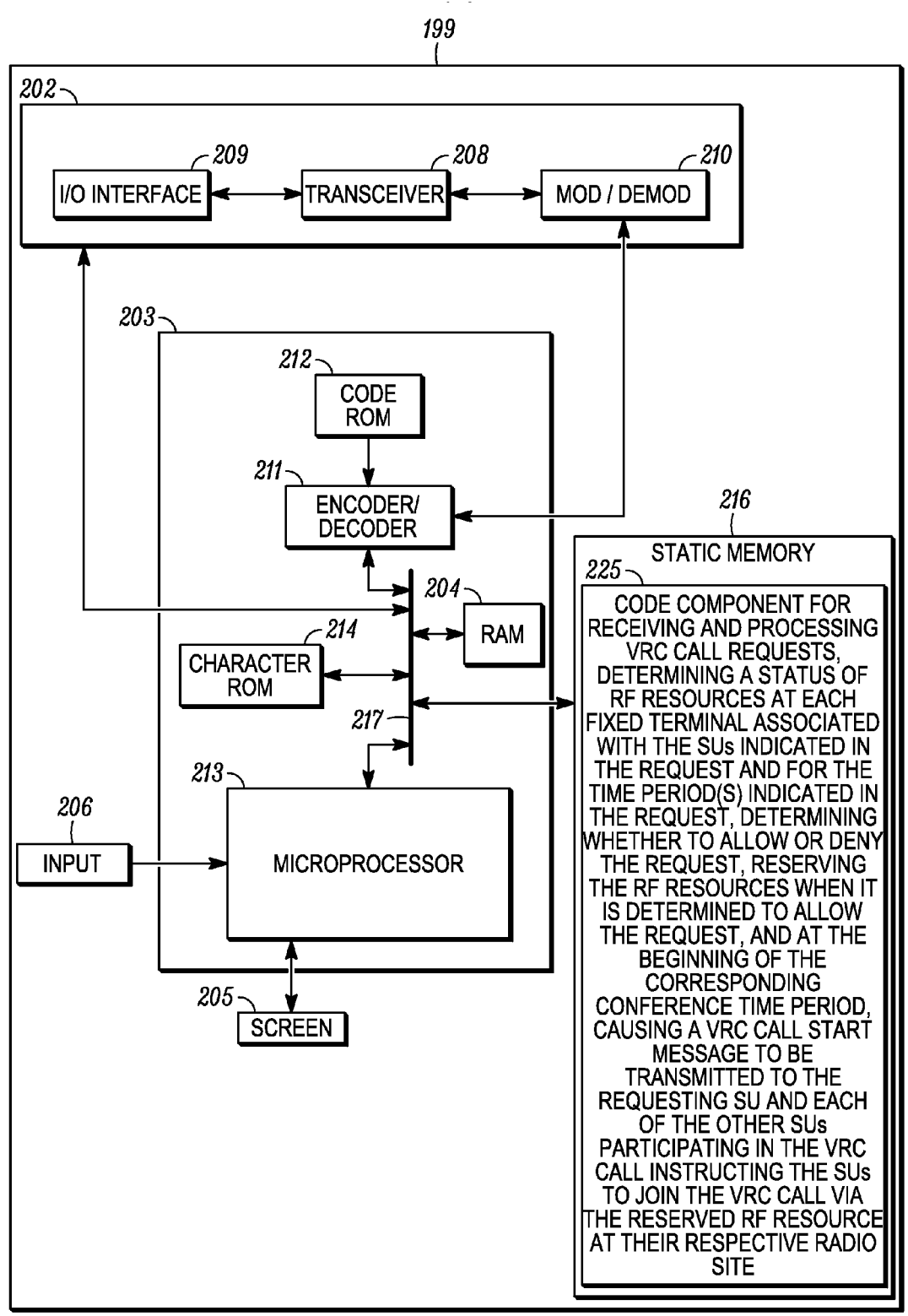
FIG. 2 is a block diagram of an illustrative layout of an infrastructure device (e.g., a scheduling controller) of the system of FIG. 1 in accordance with an embodiment.

FIG. 2 is an example functional block diagram of a SC 199 operating within the system 100 of FIG. 1 in accordance with some embodiments. Other infrastructure devices may contain same or similar structures, for example, a repeater station or BS may be an infrastructure device that provides the functionality disclosed herein with respect to the SC 199.

As shown in FIG. 2, SC 199 includes a communications unit 202 coupled to a common data and address bus 217 of a processing unit 203. The SC 199 may also include an input unit (e.g., keypad, pointing device, etc.) 206 and a display screen 205, each coupled to be in communication with the processing unit 203.

The processing unit 203 may include an encoder/decoder 211 with an associated code Read Only Memory (ROM) 212 for storing data for encoding and decoding voice, data, control, or other signals that may be transmitted or received between BSs, ZCs, SUs and/or other devices in the wireless communication system 100. The processing unit 203 may further include a microprocessor 213 coupled, by the common data and address bus 217, to the encoder/decoder 211, a character ROM 214, a Random Access Memory (RAM) 204, and a static memory 216.

The communications unit 202 may include one or more wired or wireless input/output (I/O) interfaces 209 that are configurable to communicate with BSs such as BSs 102, 141, 152, with ZCs such as ZC1 181, ZC2 182, with SUs such as SUs SU1 105 and SU2 107, with other devices in the system infrastructure 103, and/or with the dispatch consoles 121, 122. The communications unit 202 may include one or more wireless transceivers 208, such as a DMR transceiver, an APCO P25 transceiver, a TETRA transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar types of wireless transceivers configurable to communicate via a wireless network. The communications unit 202 may additionally or alternatively additionally include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210 that is coupled to the encoder/decoder 211.

The microprocessor 213 has ports for coupling to the input unit 206 and to the display screen 205. The character ROM 214 stores code for decoding or encoding messages such as control channel messages, VRC call requests or cancellations, RF resource availability information, and/or data or voice messages that may be transmitted and/or received by the SC 199. Static memory 216 may store operating code 225 for the microprocessor 213 that, when executed, receives and processes VRC call requests, determines a status of RF resources at each fixed terminal associated with the SUs indicated in the request and for the time period(s) indicated in the request, determines whether to allow or deny the request, reserves the RF resources when it is determined to allow the request, and at the beginning of the corresponding conference time period, causes a VRC call start message to be transmitted to the requesting SU and each of the other SUs participating in the VRC call instructing the SUs to join the VRC call via the reserved RF resource at their respective radio site, in accordance with one or more of FIGS. 4-6 and corresponding text. Static memory 216 may comprise, for example, a hard-disk drive (HDD), an optical disk drives such as a compact disk (CD) drive or digital versatile disk (DVD) drive, a solid state drive (SSD), a tape drive, a flash memory drive, or a tape drive, to name a few.

Figure 3:
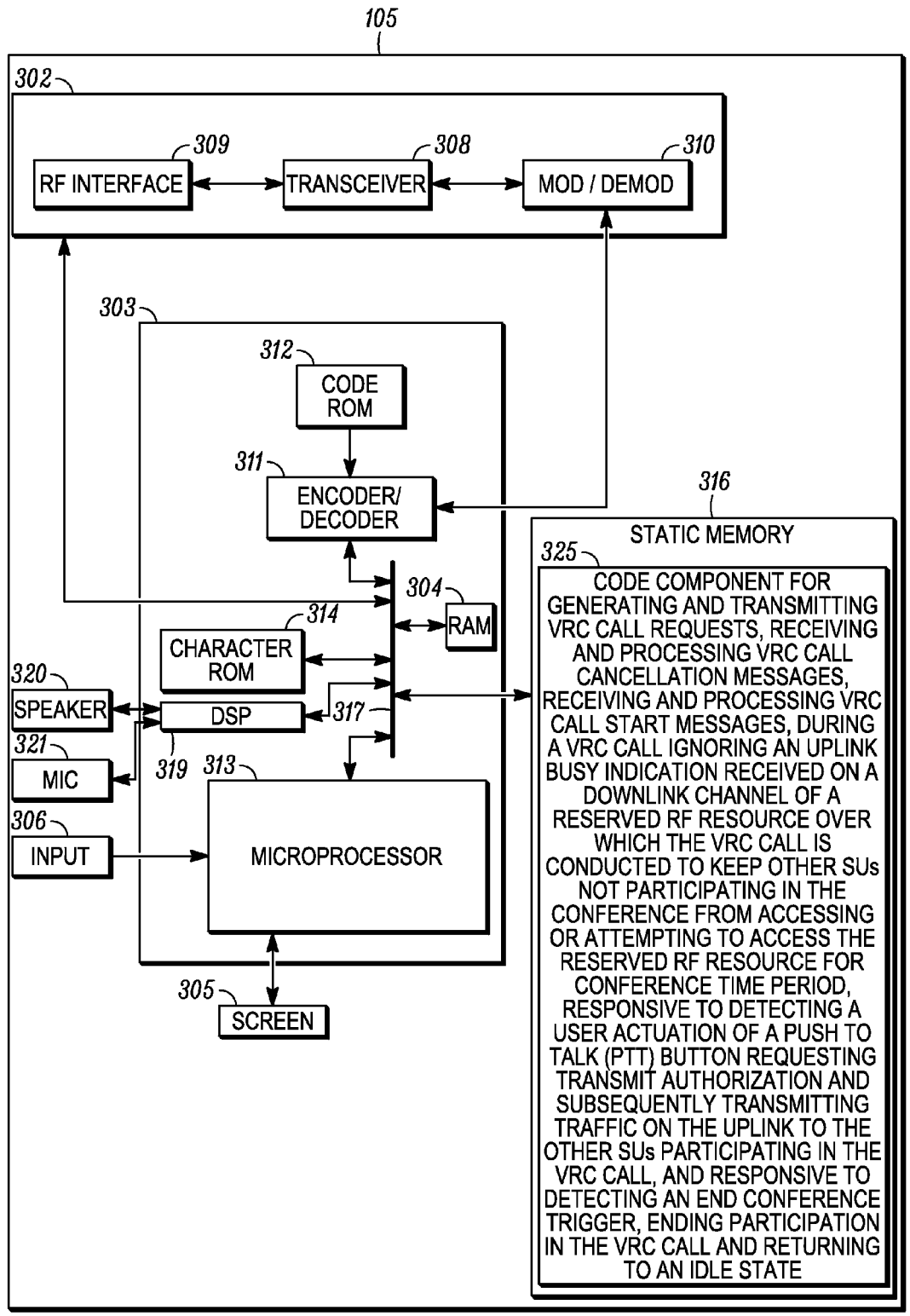
FIG. 3 is a block diagram of an illustrative layout of a subscriber unit of the system of FIG. 1 in accordance with an embodiment.

FIG. 3 is an example functional block diagram of a SU such as SU1 105 operating within the system 100 of FIG. 1 in accordance with some embodiments. Other SUs such as SUs SU2 107, SU4 145, SU5 147, SU6 155, and/or SU7 157 may contain same or similar structures. As shown in FIG. 3, SU1 105 includes a communications unit 302 coupled to a common data and address bus 317 of a processing unit 303. The SU1 105 may also include an input unit (e.g., keypad, pointing device, etc.) 306, an output transducer unit (e.g., speaker) 320, an input transducer unit (e.g., a microphone) 321, and a display screen 305, each coupled to be in communication with the processing unit 303.

The processing unit 303 may include an encoder/decoder 311 with an associated code ROM 312 for storing data for encoding and decoding voice, data, control, or other signals that may be transmitted or received between other BSs or SUs in the same radio site or zone as SU1 105. The processing unit 303 may further include a microprocessor 313 coupled, by the common data and address bus 317, to the encoder/decoder 311, a character ROM 314, a RAM 304, and a static memory 316. The processing unit may also include a digital signal processor (DSP) 319, coupled to the speaker 320, microphone 321, and the common data and address bus 317, for operating on audio signals received from one or more of a user, the communications unit 302, and the static memory 316, and providing a resultant audio signal to one of the speaker 320 or the microprocessor 313.

The communications unit 302 may include an RF interface 309 configurable to communicate with other SUs within its communication range such as SU2 107 and with BSs within its communication range such as BS 102. The communications unit 302 may include one or more wireless transceivers 308, such as an APCO P25 transceiver, a DMR transceiver, a TETRA transceiver, a Bluetooth transceiver, a Wi-Fi transceiver perhaps operating in accordance with an IEEE 802.11 standard, a WiMAX transceiver perhaps operating in accordance with an IEEE 802.16 standard, and/or other similar type of wireless transceiver configurable to communicate via a wireless network. The transceiver 308 is also coupled to a combined modulator/demodulator 310 that is coupled to the encoder/decoder 311. The character ROM 314 stores code for decoding or encoding messages such as control channel messages, VRC call requests or cancellations, and/or data or voice messages.

Figure 4:
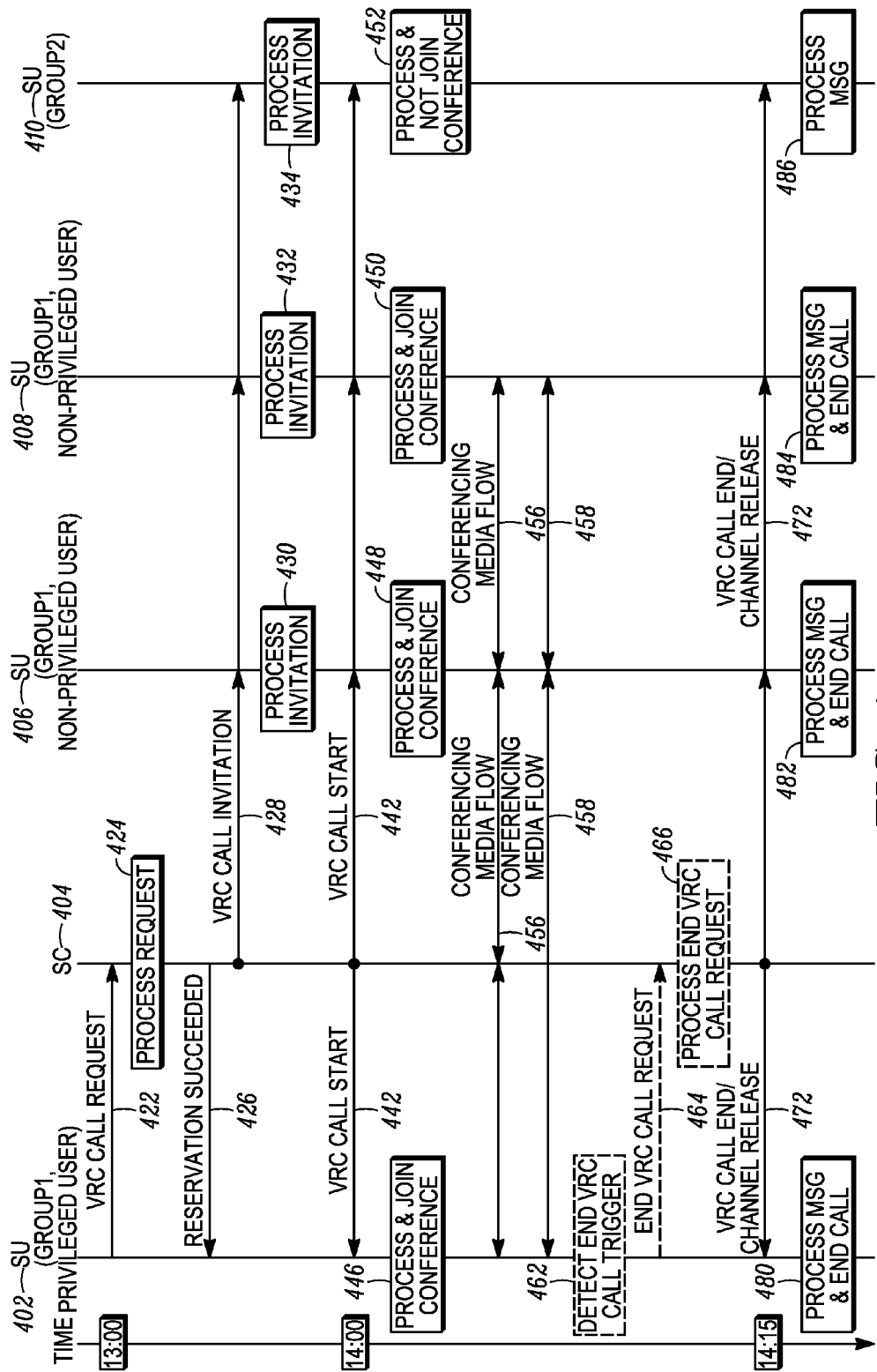
FIG. 4 is a ladder diagram illustrating a message flow between an infrastructure device (e.g., a scheduling controller), a requesting subscriber unit, and a plurality of other subscriber units, to initiate, conduct, and end a virtual radio conference call in accordance with an embodiment.
Figure 5:
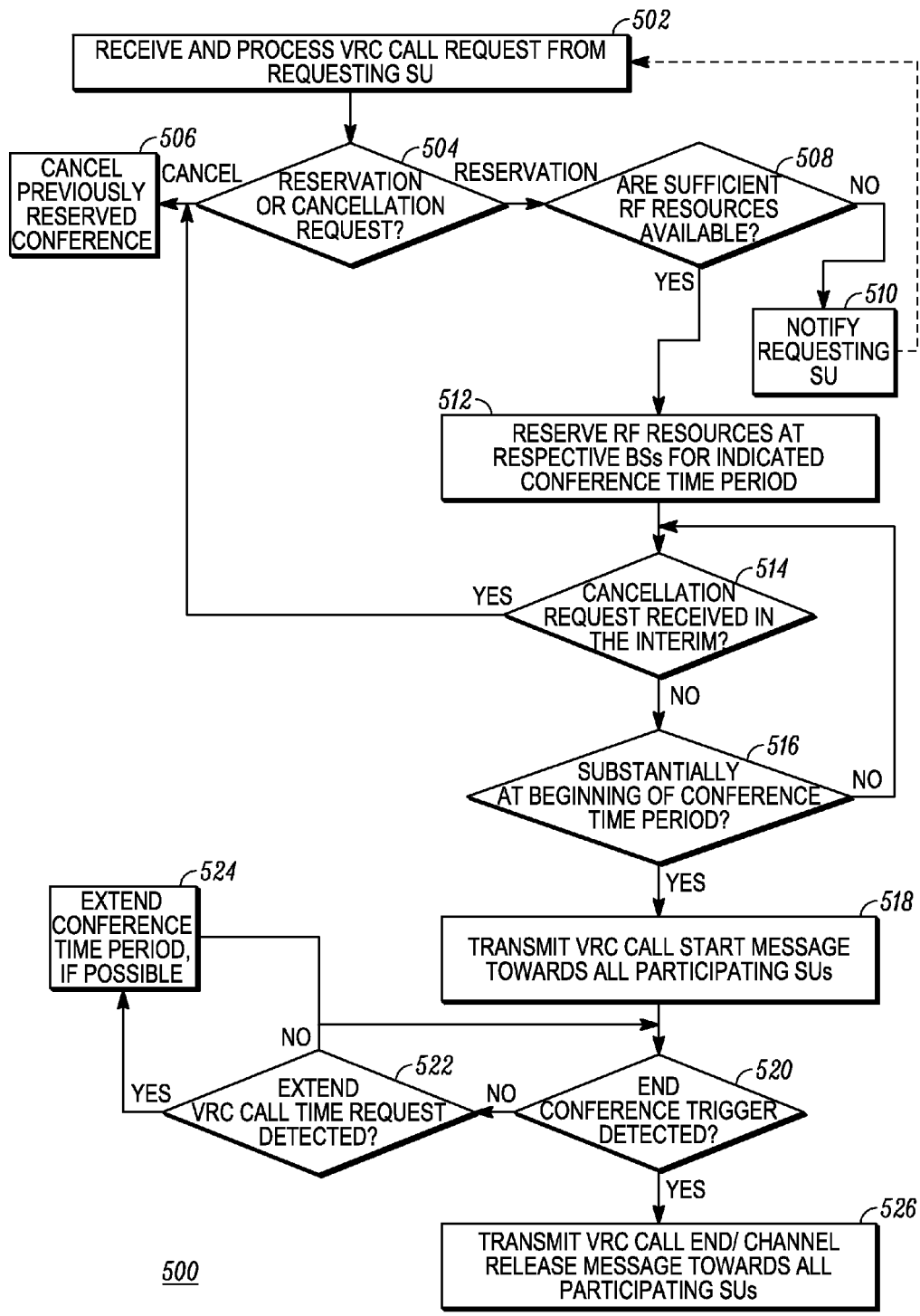
FIG. 5 is a flow chart illustrating processing steps executed at an infrastructure device (e.g., a scheduling controller) in the system of FIG. 1 in accordance with an embodiment.
Figure 6:
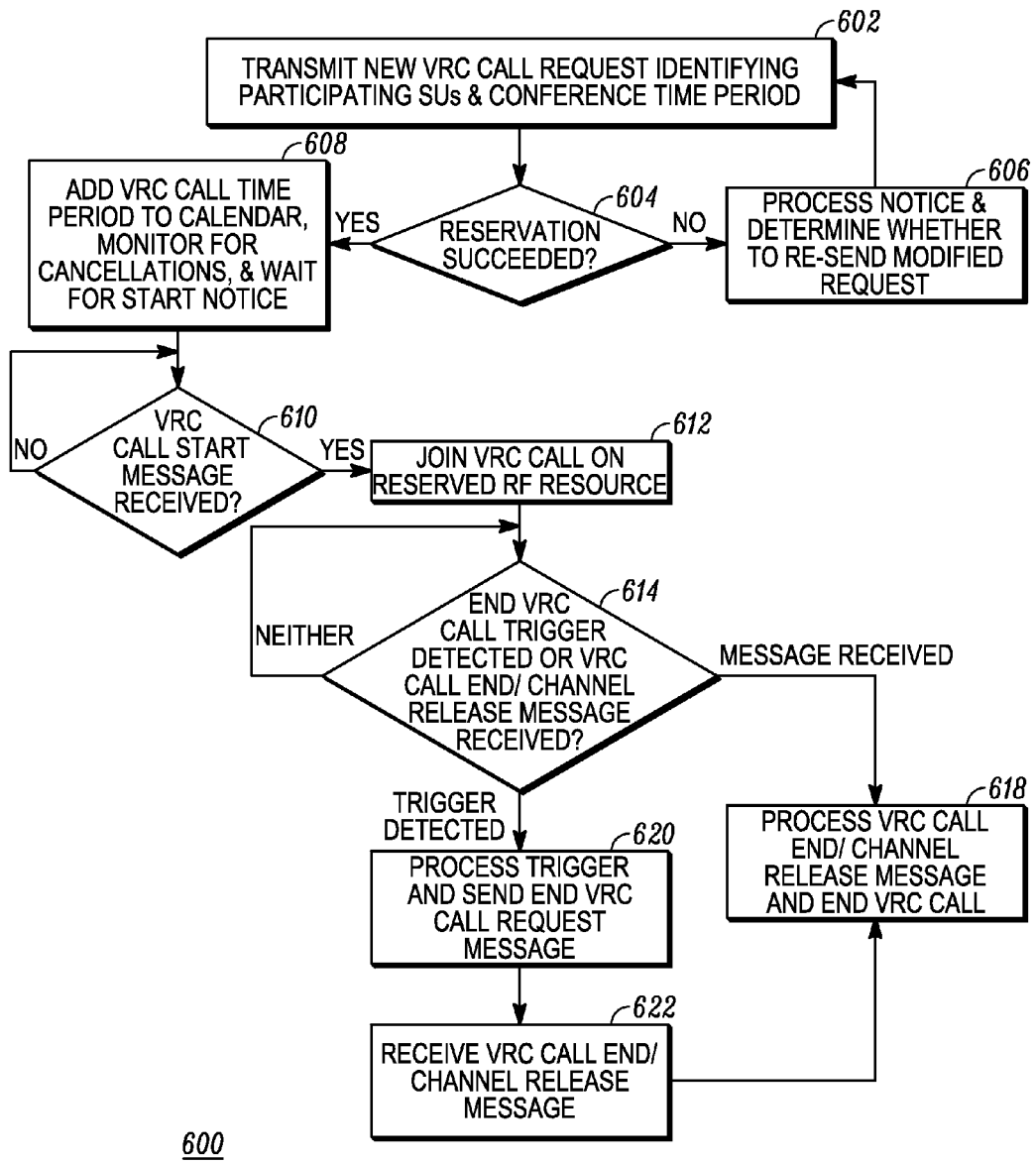
FIG. 6 is a flow chart illustrating processing steps executed at a subscriber unit in the system of FIG. 1 in accordance with an embodiment.

Static memory 316 may store operating code 325 for the microprocessor 313 that, when executed, generates and transmits VRC call requests, receives and processes VRC call cancellation messages, receives and processes VRC call start messages, during a VRC call ignores an uplink busy indication received on a downlink channel of a reserved RF resource over which the VRC call is conducted to keep other SUs not participating in the conference from accessing or attempting to access the reserved RF resource for a conference time period, responsive to detecting a user actuation of a push to talk (PTT) button requesting transmit authorization and subsequently transmits traffic on the uplink to the other SUs participating in the VRC call, and responsive to detecting an end conference trigger, ends participation in the VRC call and returns to an idle state, in accordance with one or more of FIGS. 4-6 and corresponding text. Static memory 316 may comprise, for example, a HDD, an optical disk drives such as a CD drive or DVD drive, a SSD, a tape drive, a flash memory drive, or a tape drive, to name a few.

II. VIRTUAL RADIO CONFERENCE CALL MESSAGING FLOWS

FIG. 4 is a ladder diagram that sets forth example messaging flows that may be used to request, cancel, reserve, conduct, and/or end VRC calls between SUs such as SUs 402, 406, 408, and 410 under control of an infrastructure device such as SC 404. The SU 402 of FIG. 4 may be configured similarly to the SU1 105 of FIGS. 1 and 3 and may be configured to execute one or more of the steps in process 600 set forth in FIG. 6. The SC 404 of FIG. 4 may be configured similarly to the SC 199 of FIG. 2 and may be configured to execute one or more of the steps in process 500 set forth in FIG. 5. In this example, the SU 402 is a requesting SU that initiates a VRC call and identifies SUs 406 and 408 as designated participants in the VRC call (e.g., not including SU 410). In an embodiment, the SUs other than the requesting SU 402, including SUs 406, 408, and 410 may be present at any one of radio sites 133 (e.g., the same radio site as the requesting SU 402), 143, or 153 of FIG. 1. While the respective BSs at radio sites 133, 143, 153 and the respective ZCs (ZC1 181 and ZC2 182) are not illustrated in FIG. 4 for ease of illustration, it should be assumed that for those embodiments where participating SUs are positioned at different radio sites than the requesting SU 402, messages illustrated in FIG. 4 pass through corresponding BSs and/or ZCs that appear on the path between the source of the message and the destination of the message. In embodiments in which all SUs are located at a single radio site, and perhaps where the SC 199 is present at the BS in the single radio site or electrically coupled to the BS in the single radio site, the messages illustrated in FIG. 4 may only pass through the single BS (and perhaps integrated SC) between source and destination. Other examples are possible as well.

To start the process, and perhaps in response to a user input activation at the requesting SU 402 indicating a desire to schedule a VRC call (including reception of VRC call parameters including start time, duration, and participating SUs, perhaps via a graphical user interface at the SU 402), SU 402 generates and transmits a VRC call request message 422 to the SC 404. The VRC call request message 422 includes at least an identification of participants desired to participate in the VRC call, a desired start time of the VRC call, and a conference time period including a start time and one of an end time and a duration. The start time may be a predetermined value indicating an immediate start time, or a value indicating some future start time. In some embodiments, additional information such as date of reservation, recurrence options (e.g., daily, weekly, weekdays, weekends, monthly, etc.), and other information could be received via the input and included in the VRC call request message 422 as well. The identification of participants may be in the form of a talk group identifier, identities of one or more individual radio identifiers, or a predefined value indicating that all radios in the system should be notified, among other possibilities. In this example, it is assumed that the request identifies SUs 406 and 408 as members of talk group 1 (in addition to SU 402) and as desired participants in the VRC call, while SU 410 is not a member of talk group 1 and is not a desired participant in the VRC call, and indicates a start time of 14:00 and either a duration of 15 mins or a stop time of 14:15.

At step 424, the SC 404 receives and processes the request. Included in this step may be determining each participant in the group call (e.g., mapping a talk group identifier to an associated plurality of radio IDs), determining a current location of each participant in the request (e.g., a single other radio in some embodiments, or a plurality of radios each participant mapped via the talk group identifier in some embodiments), and determining which associated BSs are currently serving the indicated participant(s). Active status information, and current serving BS information, may be maintained, and accessible by the SC 404, at various network devices, including but not limited to the SC 404 itself, ZCs (e.g., ZC1 181 and ZC2 182 of FIG. 1), BSs (e.g., BSs 102, 141, and 152 of FIG. 1), a home or visitor location registry (not shown in FIG. 1), or some other network entity.

Once each BS that will be involved in the VRC call (due to its status as serving participating SUs in the requested VRC call) is determined, the available RF resources for each BS during the conference time period indicated in the request can be determined. A database of RF resource reservations may be stored at the SC 404, or at some remote device accessible to the SC 404, or at a plurality of remote devices accessible to the SC 404, so that the SC 404 can determine whether sufficient RF resources exist at each BS indicated by the participants identified in the VRC call request. For example, an RF resources reservation look-up table such as the table set forth in Table I below may be used to track RF resource reservations across one or more BSs or radio sites.

TABLE I

Example RF Resource Reservation Table

| BS ID | RF Resources Available | Reservation Status | Time(s) Reserved |
|---|---|---|---|
| 0AEF$_{16}$ | TC 1 (Trunked) | Reserved | 14:30-15:15 15:20-15:50 |
| | TC 2 (Trunked) | Reserved | 14:00-14:30 |
| | TC 3 (Trunked) | <Null> | <Null> |
| 9F2F$_{16}$ | TC 1 (Conv.) | Reserved | 15:20-15:50 |
| 2B44$_{16}$ | TC 1 (Conv.) | Reserved | 15:20-15:50 |
| | TC 2 (Conv.) | <Null> | <Null> |

For example, the RF resource reservation table may track BSs by their associated BS identifiers (here, for example, a 4-digit hexadecimal number) and, for each BS ID, list the available RF resources at that radio site (trunked and/or conventional TCs, each TC being comprised of a pair of an uplink TC and a downlink TC, in one example), a reservation status of each of those RF resources, and for those that are already reserved, time periods during which they are reserved. Of course, in other embodiments, more or fewer columns may be present in the table, including for example, removing the BS ID column when there is only one radio-site in the system and the SC is integrated in the BS at the single radio site.

For example, the BS with an ID of 0AEF$_{16}$ may be a trunked radio site having a control channel and three (3) available TCs reservable on an as-needed basis. One of the TCs (arbitrarily identified as TC 1) is already reserved for the time periods 14:30-15:15 and 15:20-15:50 (based on a 24-hour day). For ease of illustration, it is assumed that the RF resource reservation table only lists RF resources reserved for the current day. Of course, in other embodiments, future dates of reservation could be added by also adding a date identifier to the "Time(s) Reserved" field or via the addition of another dedicated date field.

Further, the BS with an ID of 9F2F$_{16}$ has only a single conventional TC (arbitrarily identified as TC 1) available for reservation, and in this embodiment, TC 1 is already reserved for the time period 15:20-15:50. The BS with an ID of 2B44$_{16}$ has two conventional TCs available for reservation (arbitrarily identified as TC 1 and TC 2, and perhaps existing as two separate FDMA channels or two separate TDMA channels on a single frequency), and in this embodiment, TC 1 is already reserved for the time period 15:20-15:50. In some embodiments, the RF resource reservation table may identify all RF resources available at each BS ID in the system, and in other embodiments, may only identify a fraction of all RF resources available at each BS (e.g., only a fraction of RF resources are reservable in advance), depending on system configuration.

In other embodiments, RF resource reservation status information may be maintained in a distributed manner at each corresponding BS, and SC 404 may poll each associated BS that is currently serving one of the indicated participants in the VRC call request. The polling message may request a listing of all available RF resources at all times (e.g., a copy of any RF resource reservation table maintained at the BS), a listing of one available RF resource available during the time indicated in the request, a listing of all available RF resources available during the time indicated in the request, or a simple acknowledgment (ACK) or negative acknowledgment (NACK) that RF resources are, or are not, available for reservation during the time period indicated in the request. Other ways of maintaining RF resource availability could be used as well. In the example of FIG. 1, and assuming that the BS ID 0AEF$_{16}$ corresponds to BS 102, the BS ID 9F2F$_{16}$ corresponds to BS 141, and BS ID 2B44$_{16}$ corresponds to BS 152, and that SU 402 corresponds to SU1 105, SU 406 corresponds to SU4 145, and SU 408 corresponds to SU6 155, SC 199 may access a locally or remotely maintained RF resource database or poll each of the BSs 102, 141, and 152 for RF resource information at each of the BSs 102, 141, and 152.

While not illustrated in Table I above, in some embodiments, a priority level may also be stored along with each reservation such that groups with higher priorities (as pre-configured in the system) are able to reserve RF resources at the expense of a lower-priority group that may have already reserved RF resources at one or more particular times and at one or more particular radio sites. In some examples, the requesting user may be able to define the relative priority of the request via some user-definable field in the request itself.

If the SC 404 determines that sufficient RF resources are not currently available at each of the BSs that would be involved in the group call at the times indicated (e.g., perhaps because no more reservable RF resources are available at the one or more of the BSs that would be involved in the group call at the times indicated, or a prior reservation with a same or higher priority has already reserved any/all reservable RF resources at the one or more BSs that would be involved in the group call at the times indicated, or for some other reason), the SC 404 may transmit a failure notice back to the requesting SU 402 indicating the failure, and perhaps requesting another time or suggesting another time (perhaps closest to the requested time but for the same or similar duration) that it has determined sufficient RF resources would be available at all of the BSs that would be involved in the group call (not shown in FIG. 4). If a subsequent revised request is received at SC 404 indicating a time period during which sufficient resources at the BSs that would be involved in the group call at the times indicated are available, the remaining steps and message transmissions of FIG. 4 could continue to occur. Otherwise, the request would fail and the remaining steps and message transmissions of FIG. 4 would not be executed.

Assuming, instead, that the SC 404 determines that sufficient RF resources are available at the BSs that would be involved in the group call at the times indicated, the SC 404 updates the RF resource reservation table(s) (stored locally or remotely, or at the BSs in a distributed manner as set forth above), and transmits a reservation success message 426 to the requesting SU 402 and a VRC call invitation 428 4 to the other participating SUs 406 and 408.

TABLE II

Updated Example RF Resource Reservation Table

| BS ID | RF Resources Available | Reservation Status | Time(s) Reserved |
|---|---|---|---|
| $0AEF_{16}$ | TC 1 (Trunked) | Reserved | 14:30-15:15 |
| | | | 15:20-15:50 |
| | TC 2 (Trunked) | Reserved | 14:00-14:30 |
| | TC 3 (Trunked) | Reserved | 14:00-14:15 |
| $9F2F_{16}$ | TC 1 (Conv.) | Reserved | 14:00-14:15 |
| | | | 15:20-15:50 |
| $2B44_{16}$ | TC 1 (Conv.) | Reserved | 15:20-15:50 |
| | TC 2 (Conv.) | Reserved | 14:00-14:15 |

Table II above illustrates an example updated RF resource reservation table that may be stored and maintained at SC 199 after the new VRC call is committed to the RF resource reservation table. For example, the BS ID $0AEF_{16}$ now reflects a reservation of TC 3 from 14:00-14:15 for the VRC call requested in the VRC call request 422, the BS ID $9F2F_{16}$ now reflects a reservation of TC 1 from 14:00-14:15 for the VRC call requested in the VRC call request 422, and the BS ID $2B44_{16}$ now reflects a reservation of TC 2 from 14:00-14: 15 for the VRC call requested in the VRC call request 422.

In some embodiments, and as illustrated in FIG. 4, the VRC call invitation 428 may be broadcast at all BSs in the system, or at only those BSs that would be involved in the group call at the times indicated, and each SU within the corresponding radio sites of those BSs would process the VRC call invitation 428 and determine whether it is included as an intended participant in the VRC call. For example, SU 406 may process the VRC call invitation 428 at step 430, determine it is addressed to SU 406 (e.g., it is specifically addressed to SU 406 or to a talk group 1 of which it is a member, perhaps determined by comparing a talk group identification number with talk groups with which it is currently subscribed and finding a match), and will add the talk group and conference time period to a calendar maintained in a data store at the SU 406. In some embodiments, the VRC call invitation 428 may include a unique VRC call identification number for identifying the VRC call in addition to or in place of a talk group identifier, which may similarly be stored in the calendar, while in other embodiments, the identification number may be a single other radio identifier associated with one or both of the two radios partied to the call. The SU 408 would take a similar action at step 432. At step 434, the SU 410 would receive and process the VRC call invitation 428, determine it is destined for a talk group 1 of which it is not a member (perhaps by comparing a talk group identification number with talk groups with which it is currently subscribed and not finding a match), and will refrain from adding the talk group and conference time period to a calendar maintained in a data store at the SU 410. In other embodiments, the SC 404 may instead unicast or multicast the VRC call invitation 428 to only those SUs that are members of the talk group 1 via their respective serving BS(s) (in effect eliminating the delivery of the VRC call invitation 428 to SU 410 illustrated in FIG. 4).

During the time period between sending out the VRC call invitation 428 and sending out a VRC call start message 442 at the beginning of the conference time period, the SC 404 continues to monitor for cancellation requests cancelling the committed VRC call until substantially the beginning of the conference time period is reached. If a cancel VRC call request is received prior to the beginning of the conference time period, the SC may commit the changes to the RF resource reservation table removing the reservation of the RF resources for the VRC call, and send out a VRC cancellation message similar to the manner in which the VRC call invitation 428 was sent out.

In any event, assuming that no cancel VRC call requests are received, and substantially at the beginning of the conference time period indicated in the VRC call request 422 (e.g., 14:00), the SC 404 transmits a VRC call start message 442 towards all SUs participating in the VRC call. The VRC call start message 442 may identify the particular SUs to which it is directed in a number of ways, including by radio ID, by talk group ID, or perhaps by a VRC ID previously set by the VRC call invitation 428. The VRC call start message 442 transmitted by the SC 404 may specifically identify a particular RF resource previously reserved at each corresponding BS associated with the destination SUs, or each receiving BS may modify the message to identify the previously reserved RF resource, an available RF resource, or an RF resource newly made available by cancelling another ongoing group call (e.g., an unreserved group call or a lower priority previously reserved VRC call).

More specifically, if a BS determines that insufficient RF resource(s) are currently available for the reserved VRC call, it may halt a currently existing group call (or a lower priority previously reserved VRC call) in order to free up sufficient RF resources for the reserved VRC call, perhaps using a backward channel technique to interrupt the current call, and transmit the VRC call start message 442 on an outgoing control or traffic channel to the respective SUs within its coverage area identifying the reserved RF resource that will be used for the VRC call. SUs receiving the VRC call start 442 message will then process and selectively join the VRC call using the identified reserved RF resource. For example, assuming that SU 402 of FIG. 4 corresponds to SU1 105 of FIG. 1, SU 406 corresponds to SU4 145, SU 408 corresponds to SU6 155, and SU 410 corresponds to SU2 107, each of the BSs 102, 141, and 152 would receive the VRC call start 442 message as each BS serves at least one participant in the VRC call.

For example, BS 102 would receive the VRC start 442 message, identify a reserved RF resource at radio site 133, and broadcast a corresponding VRC call start message to the SUs 402/105, 410/107 at its radio site identifying the reserved RF resource on which the reserved VRC call will take place and perhaps the talk group (or particular radio IDs or VRC ID) associated with the VRC call. At step 446, SU 402/105 would process the message, determine that it is a participant in the VRC call (and in fact, is the requesting device), and join the VRC call on the indicated reserved RF resource (e.g., perhaps a particular conventional traffic channel or a particular trunked traffic channel at BS 102). At step 452, SU 410/107 would process the message, determine that it is not a participant in the VRC call, and refrain from joining the VRC call on the indicated reserved RF resource. BSs 141 and 152 would take same or similar actions as BS 102, and SUs 406/145 and 408/155 would take same or similar action at steps 448 and 450 as taken by SU 402/105 at step 446, joining the VRC call on the reserved RF resource at their respective radio site.

In some embodiments, the VRC call start 442 message may be broadcast to all SUs at all BSs participating the VRC call, and those SUs that are not participating in the VRC call (such as SU 410) would process the VRC call start 442 message at step 452 and refrain from accessing or attempting to access the reserved RF resource identified in the VRC start 442 message for at least the conference time period identified in the VRC start 442 message (unless or until an explicit VRC call end/channel release message is received). In other embodiments, all BSs participating in the VRC call may transmit an "uplink busy" indication on the downlink, whether or not the uplink is actually in use or not at that BS, in order to prevent other SUs from transmitting or attempting to transmit on the reserved RF resource during the conference time period. SUs actually participating in the VRC call can then use other payload signaling bits to obtain an indication of whether it is possible to transmit to the group (e.g., request transmit authorization, also known as requesting the floor) at any particular point in time during the conference time period (e.g., no other SU in the group is currently transmitting). In this way, a SU in the talk group participating in the VRC call can release its PTT button and not worry about losing the reserved RF resource even after a normal call hangtime period has expired. Instead, the reserved RF resource remains reserved and dedicated to the participating radios identified in the VRC call request 422 for the entire conference time period (unless or until the conference time period is explicitly cut short or expired). The uplink busy signal essentially inhibits normal group calls (e.g., impromptu group calls that are not previously reserved via the SC 404) from using the reserved RF resources for the conference time period. In some embodiments, all BSs participating in the VRC call may be configured to still allow emergency calls and/or all-calls to preempt the scheduled VRC calls, depending on system configuration.

As shown with conference media flows 456 or 458, once the VRC call is started, media may then flow between the talk group members during the allotted conference time period on the reserved RF resources. The media flows 456 or 458 may include, for example, voice, data, images, video, audio, firmware, software updates, encryption keys, or any other type of media or data that may be exchanged between radios or consoles or between members of a talk group. The media flows 456 or 458 may represent half duplex communications in which only a single SU in the group is granted the floor and is able to talk/transmit at a time (while all others listen), or may represent full duplex communications in which SUs can transmit and receive simultaneously and multiple SUs can transmit at one time. In one example, SU 402 may represent a console device such as console 121 or 122 of FIG. 1, and the media flows 456 or 458 may represent software or firmware updates distributed to targeted destination SUs during a reserved reprogramming conference time period. In another example, SUs 402, 406, and 408 may represent members of a private or government agency wishing to secure guaranteed RF resources for a particular time period to support a particular event taking place at a particular time and/or day. Other examples are possible as well.

As shown in media flow 456, the SC 404 may be partied to the VRC call, or may monitor the status of the VRC call, so that it may track RF resource usage during the reserved conference time period and, if the RF resources are not being used, return the reserved RF resources to availability for general usage (e.g., by normal group calls). For example, if the SC 404 detects that no activity is taking place over the reserved RF resources for a minimum threshold period of time (for example, more than 3 or 5 or 10 minutes), the SC 404 may take unilateral action to send out the VRC call end/channel release message 472 early, prior to the 14:15 end time set forth in the VRC call request 422.

In other embodiments, and as shown in media flow 458, the SC 404 may not be partied to the VRC call or monitor the VRC call, and the call will continue until the conference time period expires (at time 14:15 in FIG. 4) or until explicitly cancelled via a cancellation message from the requesting SU 402 (or perhaps from some other participant in the VRC call, including SU 406 or SU 408). Optional step 462 illustrates an example where the requesting SU 402 detects an end conference trigger, perhaps via a user input or via a user interface of the SU 402. In response to receiving the instruction, the SU 402 transmits an explicit end VRC call request message 464 to the SC 404. At optional step 466, the SC 404 processes the end VRC call request message and, in response, may send out the VRC call end/channel release message 472 early (not shown), prior to the 14:15 end time set forth in the VRC call request 422.

Prior to the scheduled end of the VRC call requested in VRC call request 422, the requesting SU 402, or any other participant in the VRC call for that matter, may request an extension of the conference time period (in this case, beyond 14:15). For example, an extension request message may be transmitted to SC 404 (not shown), and if the SC 404 determines that no conflicting RF reservation requests exist at the BSs participating in the call (perhaps determined in a similar manner as in step 424) for the extended time period, may extend the end time of the RF reservation associated with the VRC call beyond the time indicated in the original VRC call request 422.

Assuming that no extension requests are received, at the end time indicated in the original VRC call request 422 (14:15 in this case), the SC 404 transmits a VRC call end/channel release message 472 towards all SUs participating in the call. The VRC call end/channel release message 472 may be handled in a similar manner as the VRC call start message 442. In other words, the BSs serving the corresponding SU 402, 406, 408 will receive the VRC call end/channel release message 472 and transmit (perhaps modified) the VRC call end/channel release message 472 on an outgoing control or traffic channel to the respective participating SUs 402, 406, 408 within its coverage area. For those BSs operating as a trunked site, the VRC call end/channel release message 472 may also identify a current rest channel or control channel at the site to which the SU should return to idle and monitor for new call notifications. Furthermore, each BS may return the reserved RF resource previously used for the VRC call to an available state for general use by any other radios or group members, or may assign the reserved RF resource for use in another subsequent reserved VRC call, among other possibilities.

SUs 402, 406, and 408 previously participating in the VRC call, upon receiving the VRC call end/channel release message 472, may provide a visual or audible notification of the end of the call, and then stop any further transmission and/or reception of media flows 456, 458 on the reserved RF resource at corresponding steps 480, 482, and 484. For those SUs operating at a trunked radio site, the SU may return to a control channel or rest channel to idle and listen for future new call notifications or VRC call invitations. For those SUs operating at a conventional radio site, the SU may remain on the conventional traffic channel and listen for further new call notifications or VRC call invitations. For those SUs such as SU 410 that were not participating in the VRC call, they may receive and process the VRC call end/channel release message 472 but, in response to determining it is not intended for them, discard the message at step 486, or in other embodiments, key up and transmit any queued or buffered control, voice, or data signaling that could not previously be sent because of the reserved state of the RF resources at its serving BS.

III. VIRTUAL RADIO CONFERENCE CALL PROCESS FLOWS

FIGS. 5-6 set forth example flows of a VRC call process that may be executed at a SU and at an infrastructure device (e.g., a SC) in accordance with some embodiments. In the examples set forth in detail below, only particular sequences are disclosed with respect to the SC (FIG. 5) and the SU (FIG. 6). Of course, additional steps not disclosed herein could be additionally added before, after, or in-between steps disclosed in FIGS. 5 and 6, and the presence of such additional steps would not negate the purpose and advantages of the VRC call examples set forth in detail throughout the remainder of this disclosure.

FIG. 5 sets forth a method 500 executable at an infrastructure device, such as SC 199, for receiving and processing VRC call requests, determining a status of RF resources at each fixed terminal associated with the SUs indicated in the request and for the time period(s) indicated in the request, determining whether to allow or deny the request, reserving the RF resources when it is determined to allow the request, and at the beginning of the corresponding conference time period, causing a VRC call start message to be transmitted to the requesting SU and each of the other SUs participating in the VRC call instructing the SUs to join the VRC call via the reserved RF resource at their respective radio site. At step 502, the SC receives a VRC call request from a requesting SU and processes it.

At step 504, the SC determines whether the request is a new VRC call request or a VRC call cancellation request. If the request is a cancellation request, processing proceeds to step 506 where the SC uses the target participants and the conference time period indicated in the request (or, in some embodiments, a unique VRC call identifier) to match the VRC call indicated in the request with a previously committed VRC call (e.g., stored locally at the SC, at some remote database accessible to the SC, or in a distributed manner at the BSs). Once a match is found, the RF resource reservations associated with the VRC call are removed, and the SC refrains from starting the VRC call at the beginning of the conference time period indicated in the request.

On the other hand, if the SC determines that the request is a new VRC call reservation request at step 504, processing proceeds to step 508, where the SC determines whether sufficient RF resources are available to support the call at each BS serving SUs indicated in the request. The SC may determine whether sufficient RF resources are available at each BS serving one or more participating SUs included in the request by accessing an RF resource reservation table similar to that disclosed above available locally at the SC, at some remote device, or distributed across the BSs, or may transmit poll messages to each BS at step 508 requesting RF resource availability status or ability to provide the required RF resources to support the call. In some embodiments, a relative priority of the VRC call included in the request may be used to determine whether, and if necessary (e.g., insufficient RF resources are available at one or more of the BSs), prior lower priority RF resource reservations conflicting with the new VRC call request may be cancelled in favor of the new higher priority VRC call request. In the case where BSs are polled, the priority set forth in the request would need to be transmitted in the polling request to the BSs, or the polling response would need to include the relative priorities of the prior reservations that conflict with the new request, among other possibilities.

In addition, at this step the SC may optionally determine whether all SUs indicated in or associated with the request are available at step 508. The SU may determine an availability or reachability status of SUs included in the request or associated with a talk group included in the request by accessing a database of active users (e.g., stored locally at the SC, at some remote database accessible to the SC, or in a distributed manner at the BSs), transmitting ACK or ping messages to each of the SUs included in the request, or in some other manner. In other embodiments, the availability or reachability status of SUs participating in the VRC call is not considered by the SC at this step and/or at future steps (e.g., a best effort is made to include as many participants as possible).

If sufficient RF resources are not available (and/or, in some embodiments, not all SUs indicated in or associated with the request are available or reachable), processing may proceed to step 510 where a notice is transmitted to the requesting SU indicating a reservation failure and perhaps the reason for the failure. The notice sent at step 510 may include, for those instances where the reservation failed due to conflicting prior RF resource reservations, an identification of a closest timeslot to the originally requested timeslot where sufficient RF resources are currently available for the conference time period, or for those instances where the reservation failed due to unavailable or unreachable SUs, an identification of the one or more SUs that were unavailable or unreachable. The requesting SU could then proceed to send a subsequent updated request at step 502 that either sets forth an updated conference time period and/or an updated list of participants, or perhaps an instruction to proceed despite the lack of sufficient resources or SU unavailability.

Assuming that sufficient RF resources are determined to be available for the requested VRC call at all BSs required to participate in the call, processing proceeds to step 512 where the SC commits the RF resources to record for the requested VRC call (e.g., for the conference time period of the call indicated in the request). Commitment could include entering the VRC call parameters in a record such as the RF resource reservation table similar to that disclosed above, either locally at the SC, at some remote device, or distributed across the BSs, among other possibilities.

At steps 514 and 516, the SC continues to monitor for cancellation requests cancelling the committed VRC call until substantially the beginning of the conference time period is reached. If a cancellation request is received prior to substantially the beginning f the conference time period, processing proceeds from step 514 to step 506, already discussed above.

At step 516, the SC may begin the process of starting the VRC call on time, or slightly ahead of its actual start time (e.g., 0-5 seconds) to compensate for any transmission delays and/or processing delays in starting the VRC call so that the call begins substantially on time. For similar reasons, due to transmission delays and/or processing delays, the VRC call may be started slightly past the start time indicated in the request (e.g., 0-5 seconds). In any event, if substantially the beginning time of the conference time period is reached in step 516, processing proceeds to step 518, where the SC transmits a VRC call start message towards all participating SUs. The SC may, in some embodiments, use separate signaling prior to sending the VRC call start message to ensure that sufficient RF resources remain available at each of the radio sites to support the call in a manner similar to step 508.

In another example, and as illustrated in FIG. 5, the SC may rely upon the VRC call start message itself to provide the equivalent functionality of ensuring that sufficient RF resources remain available at each of the radio sites to support the call. For example, instructions within the VRC call start message itself or in the BSs and triggered by the VRC call start message, may cause receiving BSs to provide previously reserved RF resources for the call, provide any available RF resources for the call (e.g., that were perhaps not previously reserved), and/or halt one or more current group calls (e.g., non-reserved group calls) to make sufficient RF resources available for the call. Each receiving BS may then broadcast the VRC call start message to its SUs including an identification of the reserved RF resource channel that has been assigned for the call. In addition, the VRC call start message (or separate signaling sent between the SC and the BSs) may contain instructions instructing the BSs to maintain "uplink busy" indications on the downlink channel of the reserved RF resource in order to prevent SUs other than those participating in the VRC call from accessing or attempting to access the reserved RF resource during the conference time period.

At step 520, the SC continues to monitor, during the VRC call, for an end conference trigger. The end conference trigger could be a determination that substantially the end time of the VRC call (e.g., within approximately 0-5 seconds to allow for transmission and/or processing delays) indicated in the request has been reached, an explicit end VRC call request message has been received from the requesting SU or any other SU participating in the VRC call, or a passage of a threshold amount of time since any activity has been detected over the reserved RF resources has passed (e.g., a passage of 5, or 15, or 30 minutes without any detected activity, or a passage of 10%, 20%, or 30% of the conference time period without any detected activity, among other possibilities). If it is determined that no such trigger has been raised, processing proceeds to step 522, where the SC determines whether any extend VRC call time requests have been detected. If it is determined that an extend VRC call time request has been received from the requesting SU or any other SU participating in the VRC call, processing proceeds to step 524, where the SC determines whether sufficient RF resources exist at each of the BSs involved in the VRC call for the extended time period indicated in the extend VRC call time request. The SC may make the determination in a same or similar manner to that already set forth above with respect to step 508. If sufficient RF resources are determined to be available for the extended time period, the RF resource reservations are committed in a same or similar manner to that set forth in step 512, an optional success notification is sent to at least the extension requesting SU (and in some embodiments, all SUs participating in the VRC call notifying them of the new duration or tend time), and processing returns to step 520. Returning to step 522, if no extend VRC call time requests are detected to have been received, processing returns to step 520.

Returning to step 520, if an end conference trigger is detected, processing proceeds to step 526, where the SC transmits a VRC call end/channel release message towards all participating SUs. The SC may, in some embodiments, use separate signaling after sending the VRC call end/channel release message to ensure that the reserved RF resources are returned to an available status (assuming that they aren't needed immediately for another reserved VRC call). In another example, and as described with respect to FIG. 5, the SC may rely upon the VRC call end/channel release message itself to provide the equivalent functionality of ensuring that the reserved RF resources are returned to an available status.

For example, instructions within the VRC call end/channel release message itself may cause receiving BSs to stop transceiving on the reserved RF resource and/or start indicating the availability of the previously reserved RF resource on a downlink traffic or control channel. Each receiving BS may also broadcast the VRC call end/channel release message to its SUs including an identification of the previously reserved RF resource that has been reclaimed, and in some radio architectures such as trunked systems, an identification of a current control or rest channel in the system indicated for the newly idle SUs to idle on. In addition, the VRC call end/channel release message (or separate signaling sent between the SC and the BSs) may contain instructions instructing the BSs to stop providing the "uplink busy" bit indications on the downlink channel of the reserved RF resource that was previously used in order to prevent SUs other than those participating in the VRC call from accessing or attempting to access the reserved RF resource during the conference time period.

FIG. 6 sets forth a method 600 executable at a SU, such as SU1 105, for generating and transmitting VRC call requests, receiving and processing VRC call cancellation messages, receiving and processing VRC call start messages, during a VRC call ignoring an uplink busy indication received on a downlink channel of a reserved RF resource over which the VRC call is conducted to keep other SUs not participating in the conference from accessing or attempting to access the reserved RF resource for conference time period, responsive to detecting a user actuation of a push to talk (PTT) button requesting transmit authorization and subsequently transmitting traffic on the uplink to the other SUs participating in the VRC call, and responsive to detecting an end conference trigger, ending participation in the VRC call and returning to an idle state. At step 602, the SU detects a VRC call request input instruction, perhaps via a user input interface, and transmits a corresponding new VRC call request message to a SC, via or at its serving BS, identifying a plurality of participating SUs and a conference time period (including at least a start time and one of a duration and an end time). At step 604, the SU determines whether the reservation succeeded, perhaps by determining whether a success (e.g., ACK) or failure (e.g., NACK) message was received from the SC in response to the request. If the request was not successful, processing proceeds to step 606.

At step 606, the SU may process any failure notice it has received, and may provide an external notification to a user (via a display device) that the reservation failed, and perhaps a reason for the reservation failing (e.g., insufficient RF resources, one or more SUs are unavailable or unreachable, etc.). In addition to the display of the failure, the SU may query the user to determine whether to re-attempt the reservation request using different parameters, including a different conference time period and/or a different set of participating SUs, among other options. In one embodiment, the failure message may suggest a nearest available conference time period to the originally requested time period where the SC has determined that sufficient RF resources exist at all participating BSs. The SU may display this information as well via the display device. In the event that a user input actuation provides an indication that the user wishes to make another reservation attempt, perhaps using the suggested parameters, processing may proceed back to step 602.

Assuming that the SU determines that the reservation succeeded at step 604, processing at the SU proceeds to step 608, where the SU adds the conference time period to its calendar, perhaps via storing an indication of the conference time period in a local calendar data file on a non-transient storage medium such as static memory 316 of the SU1 105 of FIG. 3.

Subsequently, the SU will wait until substantially the conference start time to receive a VRC call start message from the SC. During the interim period, and responsive to actuation of a user input interface indicating a user's desire to cancel the reservation, the SU may transmit a VRC call cancellation request identifying the same conference time period and the same plurality of participating SUs as in the new VRC call request transmitted in step 602 (or, in some embodiments, a unique VRC call identifier associated with the RC call to be cancelled).

At step 610, the SU determines whether a VRC call start message has been received from the SC. If not, processing loops back to step 610. On the other hand, once a VRC call start message has been received, processing continues to step 612, where the SU joins the VRC call using the reserved RF resource indicated in the VRC call start message. Once joined into the VRC call, the SU can receive media flows transmitted by other SUs (and console devices) participating in the call, and can transmit media flows to all other SUs (and console devices) participating in the call. When a user desires to transmit and actuates a PTT input on the SU, the SU may look to an "uplink busy" bit indication provided on a downlink of the reserved RF resource. In some embodiments, the uplink busy indication may be determinative and, if it states that the uplink channel of the reserved RF resource is available to transmit to the group, the SU may begin transmitting on the uplink channel. In some embodiments, the uplink busy indication on the downlink channel of the reserved RF resource may always be set to "busy" during the conference time period so that all other SUs that are not part of the VRC call will avoid accessing or trying to access the reserved RF resource (with the exception, in some embodiments, of all-call and emergency calls, which may pre-empt the reserved VRC call). In this case, the SU may be further configured to look to additional payload signaling bits on the downlink, such as source ID, destination ID, or conference call ID fields, one or more of which may act as a VRC busy indicator for the VRC call, to determine whether it can transmit on the uplink, ignoring the conventional "busy" indicator bit on the downlink.

Once joined into the VRC call, a user may indicate a desire to extend the end time and/or duration of the VRC call beyond that previously indicated in the request in step 602, perhaps via a same user interface as set forth above with respect to step 602. In this instance, the SU may transmit an extend call time request message to the SC indicating a new conference end time or a new duration time (measured from the prior start time or the current time), and perhaps also indicating the same SU participants as the original request in step 602 or perhaps a unique VRC call identifier associated with the VRC call to extend. A response message received from the SC indicating a successful or unsuccessful extension of the conference time period may trigger the SU to provide a corresponding notification on a display device to the user reporting the corresponding success or failure of the extension of the VRC call and to commit any corresponding changes to the locally-stored calendar.

At step 614, the SU determines whether an end VRC call trigger is detected or whether an externally generated (and received) VRC call end/channel release message is received. If neither one is received, processing loops back to step 614. If, on the other hand, an end VRC call trigger is detected at step 614, processing continues to step 620 where the SU processes the trigger (e.g., perhaps generated in response to user-actuation of an input interface indicating a user's desire to end the VRC call early) and sends an end VRC call request message to the SC. At step 622, the SU receives a VRC call end/channel release message from the SC that either (i) affirms that the cancellation requested at step 620 was delivered to all other SUs participating in the VRC call, or (ii) is the same VRC call end/channel release message broadcast to all other SUs participating in the VRC call. Processing then proceeds to step 618 where the SU processes the VRC call end/channel release message and ends its participation in the VRC call, perhaps returning to an idle mode on a control or rest channel (in a trunked radio system architecture) or returning to an idle mode on a convention channel (in a convention radio system architecture). Returning to step 614, if it is determined that an externally-generated VRC call end/channel release message is received, perhaps due to the SC determining that an end of the conference time period has substantially been reached, or some other participating SU in the VRC call transmitted an end VRC call request message, processing proceeds to step 618 where the SU similarly processes the VRC call end/channel release message and ends its participation in the VRC call.

III. CONCLUSION

Advantageously, by allowing groups of radios to reserve RF resources in advance, groups of radios can secure elevated privileges over other groups for distinct periods of time in a secure and orderly fashion, can schedule time periods where it is ensured that each radio site at which a member of a group is operating or will be operating has sufficient RF resources to participate, and group members can communicate without fear of losing access to the reserved RF resource to other groups that key-up after a hang-time period has expired. Furthermore, group software updates can be more efficiently distributed by scheduling time periods that all or most radios can be made available and not interrupted by other communications. Furthermore, higher priority groups can be provided with higher priority access to advance RF reservations. Other advantages are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. In a two-way radio frequency (RF) communications system having a plurality of base stations (BSs), one or more RF channels, and a plurality of subscriber units, a method comprising, at a first device:
    receiving, from a first subscriber unit out of the plurality of the subscriber units, a virtual radio conferencing call request identifying (i) a plurality of other subscriber units out of the plurality of the subscriber units requested to be a party to the virtual radio conference call and (ii) a conference time period including a start time and one of an end time and a duration of the virtual radio conference call;
    identifying the plurality of the BSs in the RF communications system, each BS associated with at least one of the first subscriber unit and the subscriber units requested to be a party to the virtual radio conference call;
    prior to the start time, reserving an RF channel at each of the plurality of identified BSs for the conference time period by storing an indication of each reserved RF channel and associated BS so as to refrain from indicating availability of the each reserved RF channel for the conference time period to future virtual radio conference call requestors; and
    subsequently and substantially at a beginning of the conference time period, causing a virtual radio conference call start message to be transmitted, via corresponding the each of the plurality of the identified BSs, to the first subscriber unit and each of the plurality of the other subscriber units instructing the subscriber units to join the virtual radio conference call via the reserved RF channels at their respective BSs.

2. The method of claim 1, wherein the virtual radio conference call start message includes a particular conferencing identifier for use by the subscriber units in joining the virtual radio conference call, wherein the conferencing identifier is a talk group identifier.

3. The method of claim 1, prior to transmitting the virtual radio conference call start message, causing a virtual radio conference call invitation message to be transmitted to the each of the plurality of the other subscriber units including the conference time period and an identity of the reserved RF channel to use in joining the conference call at the subscriber unit's associated BS.

4. The method of claim 1, further comprising transmitting a reservation success notification to the first subscriber unit.

5. The method of claim 1, wherein the virtual radio conference call request further includes a priority indication, and reserving RF channels comprises cancelling a previously reserved lower priority second virtual radio conference call and sending notification of the cancellation to one or more participants in the second virtual radio conference call.

6. The method of claim 1, wherein the virtual radio conference call request includes a talkgroup identifier identifying the plurality of other subscriber units out of the plurality of subscriber units requested to participate in the virtual radio conference call.

7. The method of claim 1, wherein the identity of the plurality of other subscriber units includes all subscriber units at two or more particular BSs or all active subscriber units in the two-way RF communications system.

8. The method of claim 1, wherein a software update is transmitted to all subscriber units participating in the virtual radio conference call during the conference time period.

9. The method of claim 1, wherein voice traffic is transmitted between all subscriber units participating in the virtual radio conference call during the conference time period.

10. The method of claim 1, further comprising maintaining a record of at least a subset of available RF channels at the each BS associated with the first subscriber unit and with the each of the plurality of the other subscriber units, and wherein storing the indication of the each reserved RF channel and the associated BS comprises modifying the record to reflect time periods during which all or a portion of the subset of the available RF channels at each BS are assigned to one or more scheduled virtual radio conference calls.

11. The method of claim 1, further comprising the first device determining that a particular one of the plurality of the other subscriber units is active at an associated BS that does not have sufficient available RF channels to reserve during the conferencing time period, responsively sending a notice to the first subscriber unit identifying the particular other subscriber unit and the insufficient availability of RF channels, and subsequently receiving a request from the first subscriber unit to continue with reserving the virtual radio conference call despite the insufficient availability of RF channels.

12. The method of claim 1, further comprising at least one of the identified BSs broadcasting the conferencing start message on a control channel directing each subscriber unit within its coverage area to an RF traffic channel that has been reserved for the virtual radio conference call during the conferencing time period.

13. The method of claim 1, further comprising the identified BSs, for the conference time period, transmitting an uplink busy signal on a downlink channel of the reserved RF channel at the respective BS in order to prevent other subscriber units not partied to the virtual radio conference call from accessing or attempting to access the reserved RF channel during the conference time period.

14. The method of claim 1, wherein the two-way RF communications system is a trunked RF communication system, and the RF channels being reserved are traffic channels.

15. In a two-way radio frequency (RF) communications system having a plurality of base stations (BSs), one or more RF channels, and a plurality of subscriber units, a schedule controller device configured to:
receive, from a first subscriber unit out of the plurality of the subscriber units, a virtual radio conferencing call request identifying (i) plurality of other subscriber units out of the plurality of the subscriber units requested to be a party to the virtual radio conference call and (ii) a conference time period including a start time and one of an end time and a duration of the virtual radio conference call;
identify the plurality of the BSs in the RF communications system, each BS associated with at least one of the first subscriber unit and subscriber units requested to be a party to the virtual radio conference call;
prior to the start time, reserve an RF channel at each of the plurality of identified BSs for the conference time period by storing an indication of each reserved RF channel and associated BS so as to refrain from indicating availability of each reserved RF channel for the conference time period to future virtual radio conference call requestors; and
subsequently and substantially at a beginning of the conference time period, cause a virtual radio conference call start message to be transmitted, via a transmitter and corresponding the each of the plurality of the identified BSs, to the first subscriber unit and each of the plurality of the other subscriber units instructing the subscriber units to join the virtual radio conference call via the reserved RF channels at their respective BSs.

16. The schedule controller device of claim 15, wherein the virtual radio conference call start message includes a particular conferencing identifier for use by the subscriber units in joining the virtual radio conference call, wherein the conferencing identifier is a talk group identifier.

17. The schedule controller device of claim 15, further configured to, prior to transmitting the virtual radio conference call start message, cause a virtual radio conference call invitation message to be transmitted to the each of the other subscriber units including the conference time period and an identity of the reserved RF channel to use in joining the conference call at the subscriber unit's associated BS.

18. The schedule controller device of claim 15, wherein the virtual radio conference call request further includes a priority indication, and the schedule controller device is further configured to cancel a previously reserved lower priority second virtual radio conference call and send notification of the cancellation to one or more participants in the second virtual radio conference call.

19. The schedule controller device of claim 15, further configured to:
determine that a particular one of the plurality of the other subscriber units is active at an associated BS that does not have sufficient available RF channels to reserve during the conferencing time period, responsively send a notice to the first subscriber unit identifying the particular other subscriber unit and the insufficient availability of RF channels, and subsequently receive a request from the first subscriber unit to continue with reserving the virtual radio conference call despite the insufficient availability of RF channels.

20. In a two-way radio frequency (RF) communications system having a plurality of base stations (BSs), one or more RF channels, and a plurality of subscriber units, a first subscriber unit configured to:
transmit a new virtual radio conference call request message identifying a plurality of participating subscriber units and a conference time period;
at substantially a beginning of the conference time period, receive a virtual radio conference call start message and responsively join the conference on a reserved RF channel of an associated BS indicated in the virtual radio conference call start message;
during the virtual radio conference call, ignore an uplink busy indication received on a downlink channel of the reserved RF channel to keep other subscriber units not participating in the conference from keying up, and responsive to detecting a user actuation of a push to talk (PTT) button, request transmit authorization and subsequently transmit traffic on the uplink to the other subscriber units participating in the virtual radio conference call; and
responsive to detecting an end call trigger, ends participation in the virtual radio conference call.

21. The first subscriber unit of claim 20, further configured to, responsive to receiving a reservation success message, add the conference time period to a calendar maintained in a data store at the first subscriber unit.

* * * * *

UNITED STATES PATENT AND TRADEMARK OFFICE
CERTIFICATE OF CORRECTION

PATENT NO. : 8,831,662 B2  
APPLICATION NO. : 13/556321  
DATED : September 9, 2014  
INVENTOR(S) : Ying Qi et al.

Page 1 of 1

It is certified that error appears in the above-identified patent and that said Letters Patent is hereby corrected as shown below:

IN THE SPECIFICATION:

In Column 1, Line 40, delete "(dPMR)" and insert -- (DPMR) --, therefor.

In Column 4, Line 43, delete "SUS" and insert -- SU5 --, therefor.

In Column 7, Line 12, delete "SUS" and insert -- SU5 --, therefor.

IN THE CLAIMS:

In Claim 15, Column 23, Line 42, delete "plurality" and insert -- a plurality --, therefor.

Signed and Sealed this  
Seventeenth Day of May, 2016

Michelle K. Lee  
*Director of the United States Patent and Trademark Office*